United States Patent
Stidl et al.

(10) Patent No.: US 7,836,516 B2
(45) Date of Patent: Nov. 16, 2010

(54) CIRCUIT ARRANGEMENT AND METHOD FOR PROTECTING ELECTRONIC COMPONENTS AGAINST ILLICIT MANIPULATION

(75) Inventors: Wolfgang Stidl, Hamburg (DE); Thomas Rottschäfer, Hamburg (DE)

(73) Assignee: NXP B.V., Eindhoven (NL)

( * ) Notice: Subject to any disclaimer, the term of this patent is extended or adjusted under 35 U.S.C. 154(b) by 1179 days.

(21) Appl. No.: 10/541,881

(22) PCT Filed: Dec. 15, 2003

(86) PCT No.: PCT/IB03/06166

§ 371 (c)(1), (2), (4) Date: Jul. 7, 2005

(87) PCT Pub. No.: WO2004/063910

PCT Pub. Date: Jul. 29, 2004

(65) Prior Publication Data

US 2006/0090211 A1 Apr. 27, 2006

(30) Foreign Application Priority Data

Jan. 10, 2003 (EP) .................................. 03100033

(51) Int. Cl.
*G08B 29/04* (2006.01)
(52) U.S. Cl. .......................................... 726/34; 331/62
(58) Field of Classification Search ........................ None
See application file for complete search history.

(56) References Cited

U.S. PATENT DOCUMENTS

| | | | | |
|---|---|---|---|---|
| 4,023,163 A | * | 5/1977 | Krishnaiyer et al. | ........ 340/534 |
| 4,376,269 A | * | 3/1983 | Forward | .................. 331/117 R |
| 5,117,222 A | * | 5/1992 | McCurdy et al. | .......... 340/573.4 |
| 5,465,349 A | | 11/1995 | Geronimi et al. | |
| 5,533,123 A | * | 7/1996 | Force et al. | .................. 713/189 |
| 5,948,102 A | | 9/1999 | Wuidart | |
| 6,289,456 B1 | * | 9/2001 | Kuo et al. | ....................... 726/34 |
| 6,292,898 B1 | * | 9/2001 | Sutherland | .................... 726/34 |
| 6,330,668 B1 | * | 12/2001 | Curiger et al. | .................. 713/1 |
| 6,396,400 B1 | | 5/2002 | Epstein, III et al. | |
| 6,499,092 B1 | | 12/2002 | Harwood, III et al. | |
| 6,553,496 B1 | * | 4/2003 | Buer | ............................ 726/34 |
| 6,968,420 B1 | * | 11/2005 | Giles et al. | .................... 711/103 |
| 2001/0011353 A1 | * | 8/2001 | Little et al. | .................. 713/200 |
| 2003/0018902 A1 | * | 1/2003 | Beuten et al. | ................ 713/187 |
| 2003/0200453 A1 | * | 10/2003 | Foster et al. | ................. 713/200 |

FOREIGN PATENT DOCUMENTS

| | | |
|---|---|---|
| EP | 0 510 434 | 10/1992 |
| EP | 0 588 222 | 9/1993 |
| EP | 0 965 902 | 12/1999 |

* cited by examiner

*Primary Examiner*—Matthew B Smithers
*Assistant Examiner*—David J Pearson

(57) ABSTRACT

To provide a microelectronic circuit arrangement (100) and a method for protecting at least one electronic component against illicit manipulation and/or unauthorized access, in which circuit arrangement (100) and method there are no opportunities for manipulation even during or in connection with the start-up procedure, it is proposed that there be arranged at least activating unit (Ai; i=1, 2, 3, 4, 5) for checking whether at least one activating condition is met and for activating at least one preventing unit (Vj; j=1, 2, 3, 4, 5, 6, 7) that is also associated with the circuit arrangement (100) and that is connected to the activating unit (Ai), by means of which preventing unit (Vj) the component (200) can be at least partly de-activated and/or at least partly destroyed in the event of illicit manipulation and/or unauthorized access.

7 Claims, 1 Drawing Sheet

Figure 1:
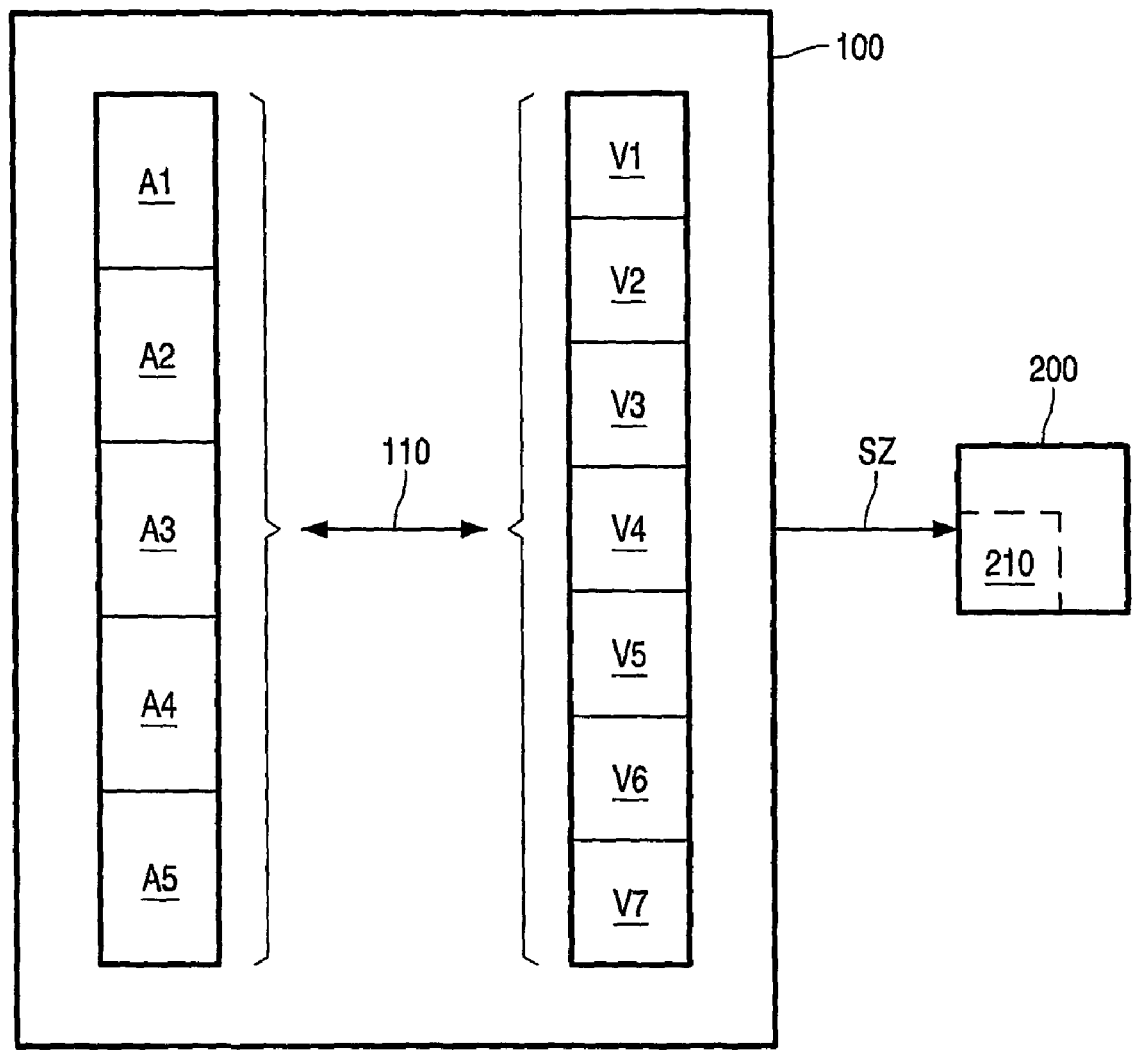

CIRCUIT ARRANGEMENT AND METHOD FOR PROTECTING ELECTRONIC COMPONENTS AGAINST ILLICIT MANIPULATION

This application is a national stage entry of PCT/IB03/06166 filed on Dec. 15, 2003.

The invention relates to the technical field of the protection of electronic components against illicit manipulation and/or unauthorized access.

Conventionally, electronic components that are to be protected against unauthorized access or against illicit changes of the contents of their memories are altered by the activation of fuses or by the storing of passwords. At the time of use, alterations of this kind are recognized in the procedure of starting up the state machine that is incorporated, or, before use, the valid password is queried and then governs other functions; also, sensors that detect an attempt to manipulate a component are analyzed in the start-up procedure The prior art systems explained above are disadvantageous inasmuch as it is possible for manipulation to take place even during the start-up procedure itself; also the start-up procedure can be performed as often as desired and may thus itself become the subject of an analysis for the purposes of manipulation.

Taking the disadvantages and shortcomings described above as a point of departure and with due allowance for the prior art that has been outlined, it is an object of the present invention to provide a microelectronic circuit arrangement and a method for protecting at least one electronic component against illicit manipulation and/or unauthorized access in which there are no opportunities for manipulation even during or in connection with the start-up procedure.

This object is achieved by a circuit arrangement having the features detailed in claim 1 and by a method having the features detailed in claim 5. Advantageous embodiments and useful further embodiments of the present invention are characterized in the dependent claims.

The microelectronic circuit arrangement according to the present invention has a plurality of units or parts, there being at least one activating unit or circuit and at least one preventing unit or circuit present together in each case.

The activating unit checks that at least one activation condition is met and, in the event of at least one activation condition (=illicit manipulation of and/or unauthorized access to the electronic component) being met, activates the preventing unit, by means of which the operation of the component can be at least partly deactivated and/or the component can be at least partly destroyed. Advantageously, the preventing unit may be constructed by using analog circuit technology or directly digital circuit technology (such as a fuse or antifuse) or even by using mixed analog/digital circuit technology.

In a particularly inventive embodiment, the check that at least one activation condition is met, i.e. the detection of the starting condition for self-destruction, may be performed by analysis of a flow of data applied from outside or by signals from the internal sensor circuitry.

With regard to the methods of activation implemented in the activating unit, there are a plurality of options that can be put into practice separately from one another or in combination with one another, such as the recognition once or more than once of at least one illicit command, the recognition of a multiplicity of different illicit operations, the issuing of at least one specific activating command, the issuing of at least one activating command together with data that is addressed to a plurality of components by means of at least one group coding, or to an individually coded component, and/or the recognition once or more than once of at least one physical attack on the component, by means of sensor circuitry belonging to the component that is intended for this purpose; what is meant by "physical attack" in this connection is for example the action of light, damage to a covering layer of the component, or movement outside permitted limiting values for frequency and/or temperature and/or for the supply voltage or for a combination of these parameters.

With regard to the methods of prevention implemented in the preventing unit, there are a plurality of options that can be put into practice separately from one another or in combination with one another, such as the prevention of at least one internal oscillator from beginning to oscillate, the prevention of at least one oscillator for an external clock signal from beginning to oscillate, the switching off of at least one high-voltage limiter, in particular by means of permanent programming, the prevention of the build-up of at least one high voltage, the reprogramming of the allocation of addresses and/or the allocation of data, the loading of at least one memory element of the component with illicit values of data;

and/or the switching on of at least one increased current drain in the operating state or the quiescent state.

So, to sum up, the present invention may be implemented by a circuit arrangement that may for example be of a mixed analog/digital nature and that, on activation of the circuit arrangement by external commends that are recognized or by internal sensors, deactivates the electronic component and/or triggers further faults, preferably irreversibly.

For this purpose, further fuses, which stop the electronic component from operating from the very outset or even cause deliberate additional consequential faults, are activated in addition to conventional memory-based soft fuses with the help of the monitoring and high-voltage circuits that are incorporated in, for example, E[lectrically]E[rasable]P[rogrammable]R[ead]O[nly]M[emory] or flash products.

The security of the EEPROM or flash products against snooping and against analysis is increased in this way; also, the customer is provided with an opportunity of deliberately deactivating or irreversibly damaging his product when in field use, by using suitable software, where this appears to the customer to be necessary in the event of at least one activation condition having been met.

In a particularly useful manner, the correlation described above, in combination with sensor-monitored covering layers on EEPROM or flash products, may be used to destroy the latter on their being partly or completely reverse-prepared for analysis purposes.

In addition, the functions described above are useful even for the end-customer, especially in S[mart]C[ard]C[ontroller] chips, because the end-customer can then de-activate products in use in the field, for example deliberately, when in contact with the master system.

The present invention finally relates to the use of at least one circuit arrangement of the kind described above and/or of a method of the kind described above to cause the self-destruction of at least one integrated circuit in the event of unauthorized use in the field or in the event of an illicit attempt to analyze the integrated circuit by at least partial reverse preparation.

As already discussed above, there are various possible ways in which the teaching of the present invention may be embodied and developed. For this, on the one hand reference should be made to the claims dependent on claim 1 and claim 5, and on the other these and other aspects of the invention are apparent from and will be elucidated with reference to the embodiments described hereinafter.

In the drawings:

FIG. 1 is a block diagram giving a diagrammatic view of one embodiment of a circuit arrangement according to the present invention that makes use of the method according to the present invention.

Shown in FIG. 1 is an embodiment of a microelectronic circuit arrangement 100 intended for protecting an electronic component 200 against illicit manipulation and unauthorized access.

Basically, this circuit arrangement 100 operates by employing the following method of operation:

(i) the fulfillment of an activation condition is checked for by means of activating units A1, A2, A3, A4, A5, where (i.1) activating unit A1 is arranged to recognize an illicit command once or more than once, (i.2) activating unit A2 is arranged to recognize a multiplicity of different illicit operations, (i.3) activating unit A3 is arranged to issue a given activating command, (i.4) activating unit A4 is arranged to issue an activating command together with data that addresses a plurality of components by means of at least one group coding, or an individually coded component, and/or (i.5) activating unit A5 is arranged to recognize once or more than once a physical attack on the component 200, by means of sensor circuitry belonging to the component 200 that is intended for this purpose, (ii) in the event of illicit manipulation of the component 200 and/or unauthorized access to the component 200 being recognized: one or more preventing units V1, V2, V3, V4, V5, V6, V7 connected to the activating units A1, A2, A3, A4, A5 are activated, where (ii.1) preventing unit V1 is arranged to prevent an internal oscillator from beginning to oscillate (ii.2) preventing unit V2 is arranged to prevent an oscillator for an external clock signal from beginning to oscillate, (ii.3) preventing unit V3 is arranged to switch off a high-voltage limiter, in particular by means of permanent programming, (ii.4) preventing unit V4 is arranged to prevent the build-up of a high voltage, (ii.5) preventing unit V5 is arranged to reprogram the allocation of addresses and/or the allocation of data, (ii.6) preventing unit V6 is arranged to load the memory element 210 of the component 200 with illicit values of data, and/or (ii.7) preventing unit V7 is arranged to switch on an increased current drain in the operating state or the quiescent state, and (iii) the component 200 is deactivated and/or the component 200 is destroyed by means of preventing units V1, V2, V3, V4, V5, V6, V7.

The embodiment shown in FIG. 1 is based specifically on the principle of de-activating the high voltage:

If the activation condition is met, i.e. if a start condition for the self-destruction is recognized—either by analyzing an externally applied flow of data or by signals from the internal sensor circuitry of the component 200—this recognition and the desired effects it is to have are placed in store in coded form in the memory 210 that is used for start-up, namely in the form of the self-destruction SZ and the prevention methods V1, V2, V4, V7.

In the next step, the start-up procedure, which initiates the appropriate actions when the condition for the self-destruction SZ is recognized, is repeated.

At the next attempt to start up the product, the conditions that arise are as follows:

[a] the conditions are read out,

[b] prevention method V7 is set:
    increased current drain is switched on,

[c] prevention method V4 is set:
    the generation of high voltage is blocked,

[d] prevention method V2 is set:
    the external clock signal is ignored,

[e] prevention method V1 is set:
    the internal clock signal is stopped.

Consequently, different states can be brought into being between total non-functioning of the component 200, restriction of the scope of functions of the component 200 (programming not now possible, say) through to deliberate faults in the environment of the integrated circuit (increased quiescent current, say, for battery-operated applications for example).

LIST OF REFERENCE NUMERALS

100 Microelectronic circuit arrangement
110 Connection between activating units Ai (i=1, 2, 3, 4, 5) and preventing units Vj (j=1, 2, 3, 4, 5, 6, 7)
200 Electronic component
210 Memory element of component 200
A1 First activating unit or first method of activation
A2 Second activating unit or second method of activation
A3 Third activating unit or third method of activation
A4 Fourth activating unit or fourth method of activation
A5 Fifth activating unit or fifth method of activation
SZ Self-destruction
V1 First preventing unit or first method of prevention
V2 Second preventing unit or second method of prevention
V3 Third preventing unit or third method of prevention
V4 Fourth preventing unit or fourth method of prevention
V5 Fifth preventing unit or fifth method of prevention
V6 Sixth preventing unit or sixth method of prevention
V7 Seventh preventing unit or seventh method of prevention

The invention claimed is:

1. A method of protecting at least one electronic component of a product against illicit manipulation and/or unauthorized access, characterized by the following method steps:
   (i) checking that at least one activation condition is met by means of at least one activating unit,
   (ii) if at least one activation condition is met, recognition of this fact and the desired effects it is to have are placed in store in coded form in at least one memory element that is used for starting-up the component, and at the next attempt to start up the product;
reading out the activation condition; and
(iii) in response to the activation condition, activating at least one preventing unit that is connected to the activating unit and at least partly de-activating the operation of the component and/or at least partly destroying the component, by means of the preventing unit;
characterized in that the at least partial de-activation of the operation of the component and/or the at least partial destruction of the component is carried out during the start-up of the product by
(j=1) preventing an internal oscillator from beginning to oscillate;
(j=2) preventing an oscillator for an external clock signal from beginning to oscillate;
(j=4) preventing the build-up of a high voltage; and
(j=7) switching on an increased current drain in the operating state or the quiescent state.

2. A method as claimed in claim 1, characterized in the check on whether the activation condition is met is made by analyzing at least one data stream applied from outside or by signals from the internal sensor circuitry of the component.

3. A method as claimed in claim 1, characterized in that the activation takes place
(i=1) as a result of the recognition once or more than once of at least one illicit command,
(i=2) as a result of the recognition of a multiplicity of different illicit operations,
(i=3) as a result of the issue of at least one specific activating command,
(i=4) as a result of the issue of at least one activating command together with data that addresses a plurality of components by means of at least one group coding, or an individually coded component, and/or
(i=5) as a result of the recognition once or more than once of at least one physical attack on the component, by means of sensor circuitry belonging to the component that is intended for this purpose.

4. A method as claimed in claim 1, characterized in that the at least partial de-activation of the operation of the component and/or the at least partial destruction of the component is carried out by
(j=3) switching off a high-voltage limiter, in particular by means of permanent programming,
(j=5) reprogramming the allocation of addresses and/or the allocation of data, and/or
(j=6) loading at least one memory element of the component with illicit values of data.

5. A method of protecting at least one electronic component of a product against illicit manipulation and/or unauthorized access, characterized by the following method steps:
checking that at least one activation condition is met by means of at least one activating unit,
if at least one activation condition is met, recognition of this fact and the desired effects it is to have are placed in store in coded form in at least one memory element that is used for starting-up the product, and
at the next attempt to start up the product;
reading out the activation condition; and
at least partly de-activating the operation of the electronic component and/or at least partly destroying the electronic component, by means of a preventing unit;
characterized in that the at least partial de-activation of the operation of the component and/or the at least partial destruction of the component is carried out during the start-up of the product by;
switching on an increased current drain;
blocking generation of high voltage;
ignoring an external clock signal; and
stopping an internal clock signal.

6. A method as claimed in claim 5, characterized in that the check on whether the activation condition is met is made by analyzing at least one data stream applied from outside or by signals from the internal sensor circuitry of the component.

7. A method as claimed in claim 5, characterized in that the activation takes place
(i=1) as a result of the recognition once or more than once of at least one illicit command,
(i=2) as a result of the recognition of a multiplicity of different illicit operations,
(i=3) as a result of the issue of at least one specific activating command,
(i=4) as a result of the issue of at least one activating command together with data that addresses a plurality of components by means of at least one group coding, or an individually coded component, and/or
(i=5) as a result of the recognition once or more than once of at least one physical attack on the component, by means of sensor circuitry belonging to the component that is intended for this purpose.

* * * * *